(12) United States Patent
Chae

(10) Patent No.: US 9,316,296 B2
(45) Date of Patent: Apr. 19, 2016

(54) REDUCER INCLUDING PLANETARY GEAR AND STEERING APPARATUS FOR VEHICLE INCLUDING THE SAME

(71) Applicant: MANDO CORPORATION, Pyeongtaek-si, Gyeonggi-do (KR)

(72) Inventor: Han Sang Chae, Seongnam-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 31 days.

(21) Appl. No.: 14/290,424

(22) Filed: May 29, 2014

(65) Prior Publication Data

US 2014/0352465 A1 Dec. 4, 2014

(30) Foreign Application Priority Data

May 30, 2013 (KR) ........................ 10-2013-0061769

(51) Int. Cl.
| | |
|---|---|
| *F16H 19/04* | (2006.01) |
| *F16H 57/08* | (2006.01) |
| *F16H 1/28* | (2006.01) |
| *B62D 5/04* | (2006.01) |
| *B62D 3/12* | (2006.01) |

(52) U.S. Cl.
CPC .............. *F16H 19/04* (2013.01); *B62D 5/0415* (2013.01); *F16H 1/2836* (2013.01); *F16H 57/082* (2013.01); *B62D 3/12* (2013.01); *F16H 2001/2872* (2013.01); *F16H 2057/085* (2013.01); *Y10T 74/18096* (2015.01)

(58) Field of Classification Search
None
See application file for complete search history.

(56) References Cited

U.S. PATENT DOCUMENTS

| | | | | |
|---|---|---|---|---|
| 3,921,264 A | * | 11/1975 | Madonian et al. ............ | 475/154 |
| 4,765,425 A | * | 8/1988 | Saito et al. .................... | 180/444 |
| 2002/0091030 A1 | * | 7/2002 | Haga et al. ..................... | 475/163 |
| 2003/0116376 A1 | * | 6/2003 | Uryu et al. ..................... | 180/446 |
| 2005/0288142 A1 | * | 12/2005 | Yamanaka et al. ............... | 475/4 |
| 2011/0124463 A1 | * | 5/2011 | Sugino .......................... | 475/296 |
| 2011/0245031 A1 | * | 10/2011 | Saenz De Ugarte Sevilla et al. ............................ | 475/347 |
| 2013/0130857 A1 | * | 5/2013 | Gassmann .................... | 475/150 |

FOREIGN PATENT DOCUMENTS

DE 102010032252 A1 * 1/2012

* cited by examiner

*Primary Examiner* — Justin Holmes
*Assistant Examiner* — Timothy M Hannon
(74) *Attorney, Agent, or Firm* — McDermott Will & Emery LLP

(57) ABSTRACT

The present invention relates to a reducer including a planetary gear and a steering apparatus of a vehicle including the same, and more particularly to a reducer including a planetary gear which can compensate a gap generated by wear of gear teeth of planet gears, sun gears, and ring gears, and a steering apparatus of a vehicle including the same.

12 Claims, 9 Drawing Sheets

REDUCER INCLUDING PLANETARY GEAR AND STEERING APPARATUS FOR VEHICLE INCLUDING THE SAME

CROSS-REFERENCE TO RELATED APPLICATION

This application claims priority from and the benefit under 35 U.S.C. §119(a) of Korean Patent Application No. 10-2013-0061769, filed on May 30, 2013, which is hereby incorporated by reference for all purposes as if fully set forth herein.

BACKGROUND OF THE INVENTION

1. Field of the Invention

The present invention relates to a reducer including a planetary gear and a steering apparatus of a vehicle including the same, and more particularly to a reducer including a planetary gear which can compensate for a gap generated by wear of gear teeth of planet gears, sun gears, and ring gears, and a steering apparatus of a vehicle including the same.

2. Description of the Prior Art

FIG. 1 is a sectional view of a reducer using a planetary gear used in a steering apparatus of a vehicle according to the related art.

As shown in FIG. 1, the reducer using a planetary gear according to the related art includes an input shaft 110 connected to a steering shaft (not shown), a first sun gear 120 formed at a lower end of the input shaft 110, first stage planet gears 170, a second stage planet gears 180 connected to the first stage planet gears 170 by connecting shafts 175, a second sun gear 130 circumscribed about the second stage planetary gears 180, an output shaft 140 connected to the second sun gear 130, a worm wheel to which one end of the connecting shaft 175 is coupled, a worm 160 engaged with the worm wheel 150, and a carrier 190 to which an opposite end of the connecting shaft 175 is coupled.

Meanwhile, a reducer using a planetary gear constitutes, for example, an active front wheel steering apparatus of a vehicle, and a process of adjusting a ratio of an input angle and an output angle of the active front wheel steering apparatus will be briefly described below.

If a steering shaft connected to a steering wheel is rotated as a driver operates the steering wheel, an input shaft 110 connected to the steering shaft is rotated, and accordingly, a first sun gear 120 formed at a lower end of an input shaft 110 is rotated.

In this case, the first stage planet gears 170 circumscribed about the first sun gear 120 are rotated, and the second stage planet gears 180, and the second stage planet gears 180 connected to the first stage planet gears 170 by the connecting shafts 175 are rotated.

Finally, the second sun gear 130 inscribed in the second stage planet gears 180 is rotated, and accordingly, the output shaft 140 extending from the second sun gear 130 is rotated, so that a steering force generated as the driver operates the steering wheel is transferred to a rack-pinion mechanism (not shown) through the output shaft 140.

Meanwhile, if electrical signals generated by several sensors are forwarded to an ECU (not shown), the ECU drives a motor and the worm wheel 150 engaged with the worm 160 is rotated while the worm 160 connected to a motor shaft is rotated, and finally, the carrier 190 integrally formed with the worm wheel 150 is rotated such that a ration of an output angle to an input angle can be adjusted.

However, in the reducer using a planetary gear according to the related art, it is difficult to precisely control steering due to a backlash generated by wear of gear teeth, and in particular, noise generated due to a backlash of a steering apparatus of a vehicle causes an uncomfortable feeling during steering operations and noise increases as the gear teeth are worn out.

SUMMARY OF THE INVENTION

The present invention has been made in an effort to solve the above-mentioned problems, and it is an object of the present invention to provide a reducer including a planetary gear which can compensate for a gap generated by the wear of gear teeth of planet gears, sun gears, and ring gears, and a steering apparatus of a vehicle including the same.

The objects of the present invention are not limited thereto, and other unmentioned objects will be clearly understood by those skilled in the art.

In accordance with an aspect of the present invention, there is provided a reducer comprising a planetary gear, the reducer including: a sun gear coupled to a hollow motor shaft; a plurality of first planet gears circumscribed about the sun gear and inscribed in a first ring gear coupled and fixed to an inner peripheral surface of the housing; a plurality of second planet gears inscribed in a second ring gear to which the pinion shaft inserted into the motor shaft and connected to the first planet gears via connecting shafts; a carrier through which the pinion shaft passes and having coupling holes such that the connecting shafts pass through and are coupled to the coupling holes, in which a distance from the center thereof to the center of a first coupling hole of the coupling holes and a distance from the center thereof to the centers of the remaining coupling holes are different; and a first resilient member coupled between a first connecting shaft inserted into the first coupling hole and the first coupling hole.

In accordance with another aspect of the present invention, there is provided a reducer comprising a planetary gear, the reducer including: a sun gear coupled to a hollow motor shaft; a plurality of first planet gears circumscribed about the sun gear and inscribed in a first ring gear coupled and fixed to an inner peripheral surface of the housing; a plurality of second planet gears inscribed in a second ring gear to which the pinion shaft inserted into the motor shaft and connected to the first planet gears via connecting shafts; a carrier having coupling holes such that the connecting shafts pass through and are coupled to the coupling holes and through which the pinion shaft passes; and a first resilient member coupled between a first connecting shaft of the connecting shafts, for providing a resilient support force in a radial direction of the carrier.

In accordance with another aspect of the present invention, there is provided a steering apparatus of a vehicle, including: a motor comprising a motor housing and a hollow motor shaft; an input shaft connected to a steering shaft and connected to a pinion shaft via a torsion bar; and a reducer comprising a planetary gear which is provided within a housing coupled to the motor housing to transfer rotation power of the motor to the pinion shaft.

According to the embodiments of the present invention, a gap generated due to wear of gear teeth of planet gears, sun gears, and ring gears can be compensated.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the exemplary drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1:
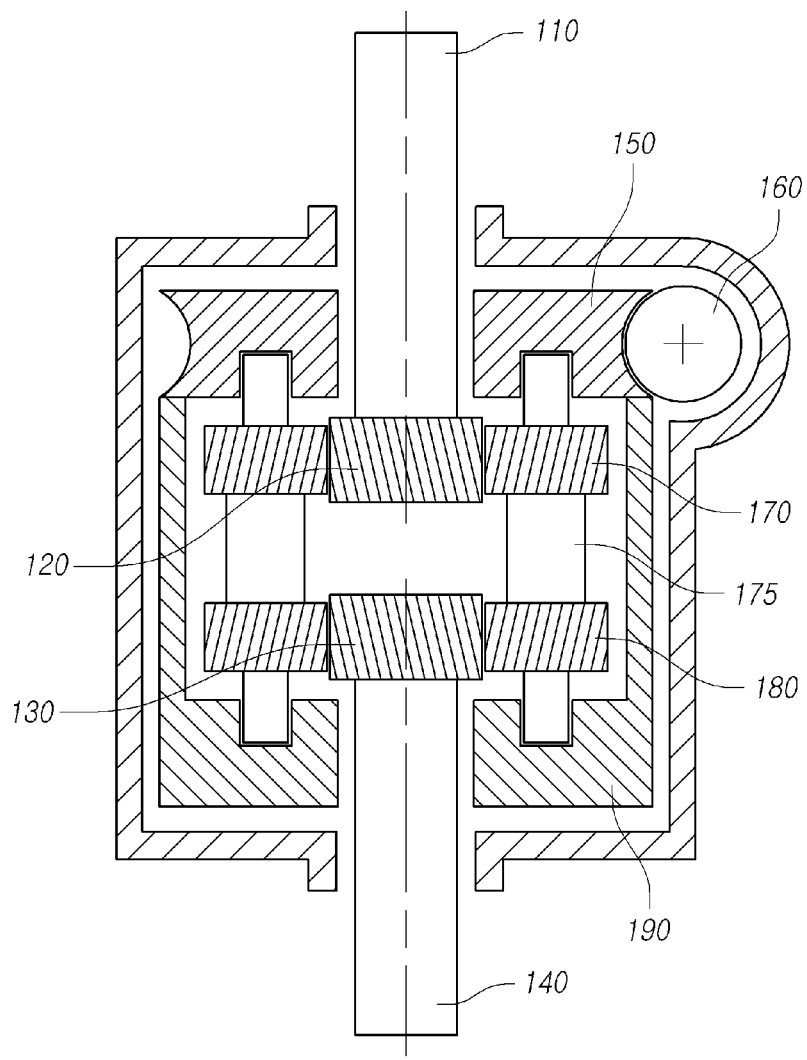
FIG. 1 is a sectional view of a reducer using a planetary gear used in a steering apparatus of a vehicle according to the related art.
Figure 2:
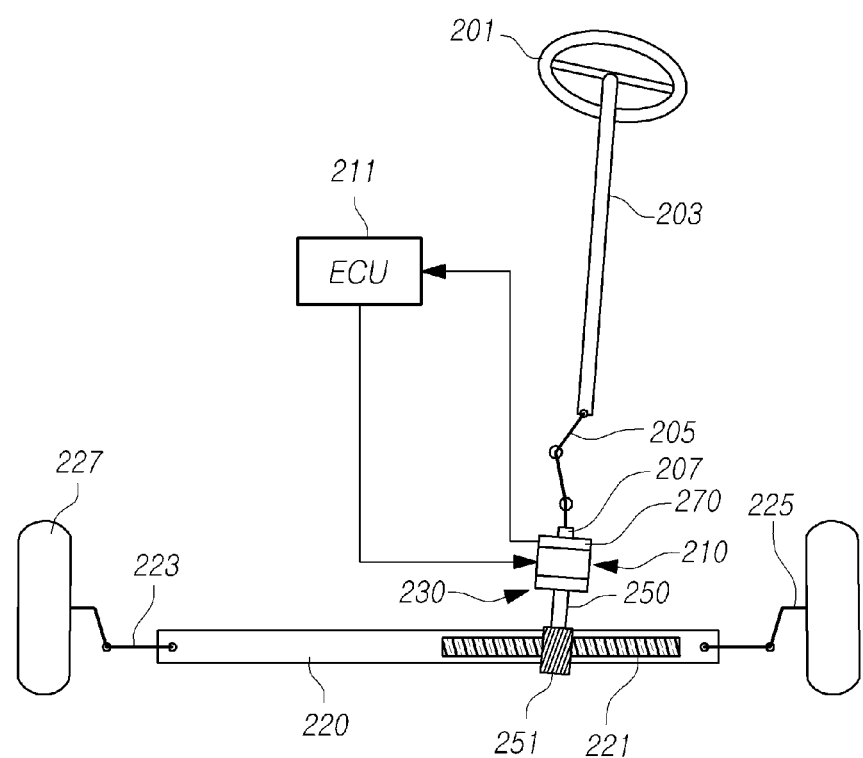
FIG. 2 is a diagram of a steering apparatus of a vehicle including a reducer including a planetary gear according to an embodiment of the present invention.
Figure 3:
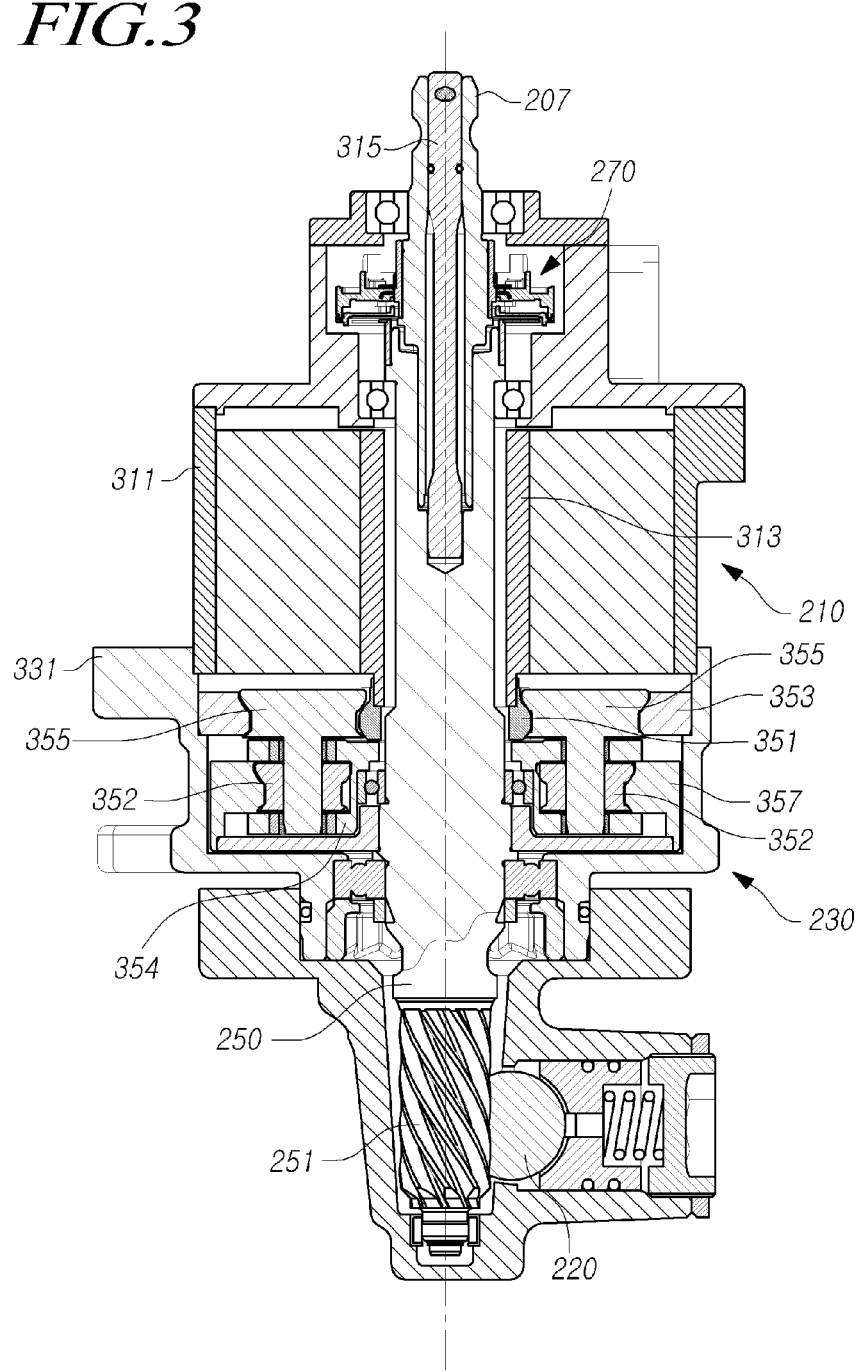
FIG. 3 is a sectional view of a portion of FIG. 2.
Figure 4:
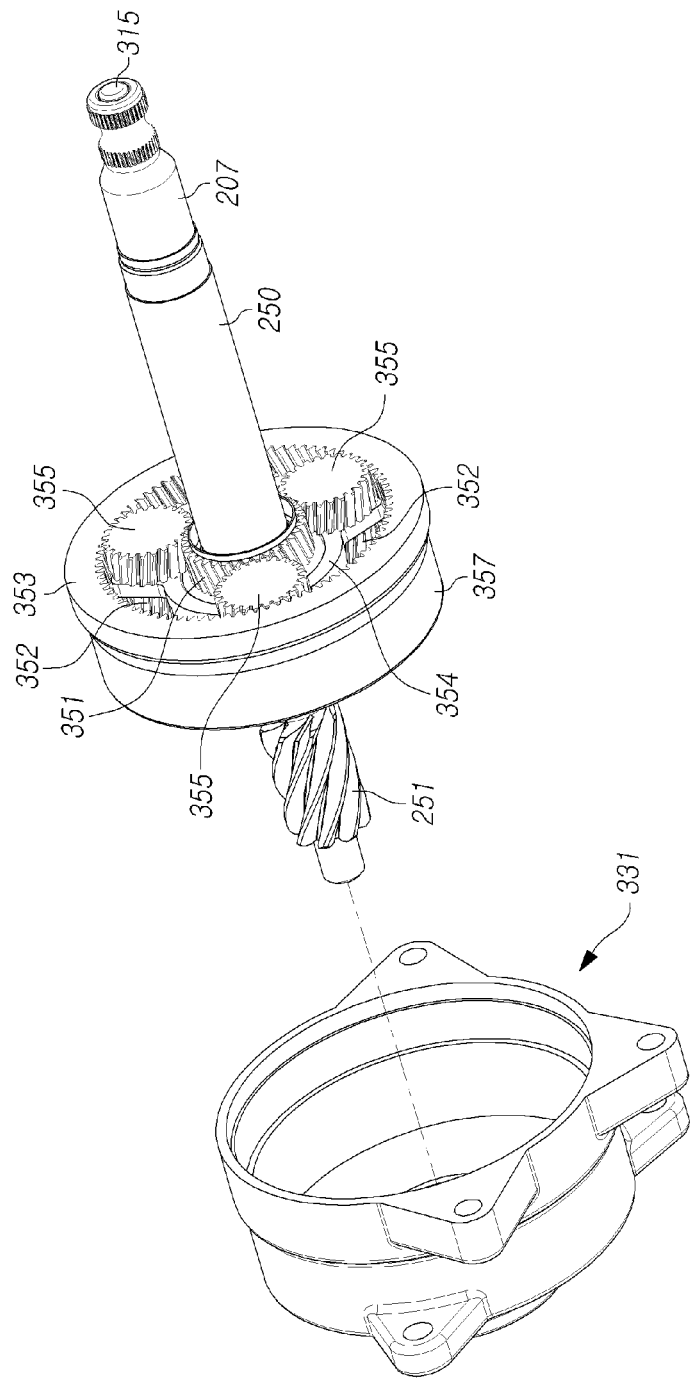
FIG. 4 is an exploded perspective view of a portion of the reducer of FIG. 3.
Figure 5:
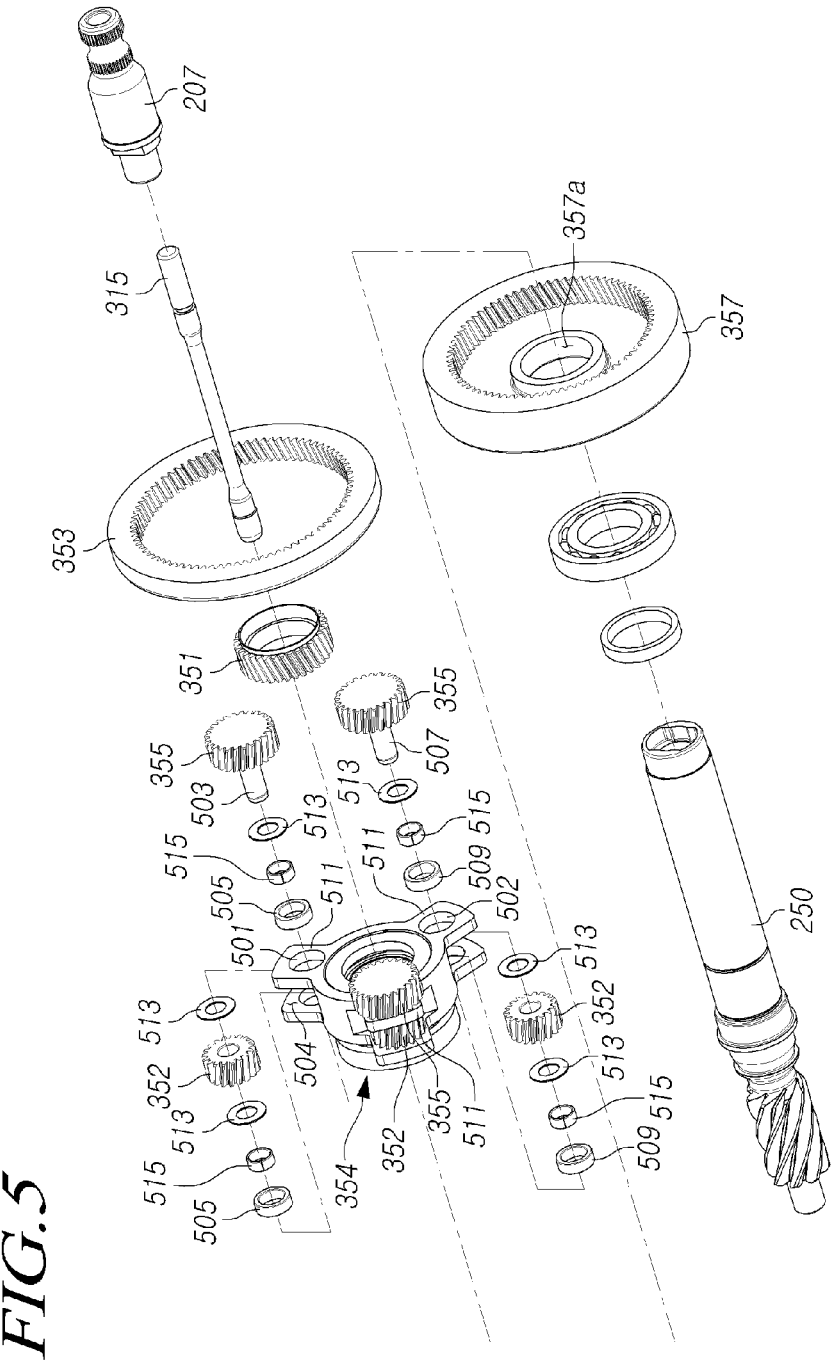
FIG. 5 is an exploded perspective view of the reducer of FIG. 4.
Figure 6:
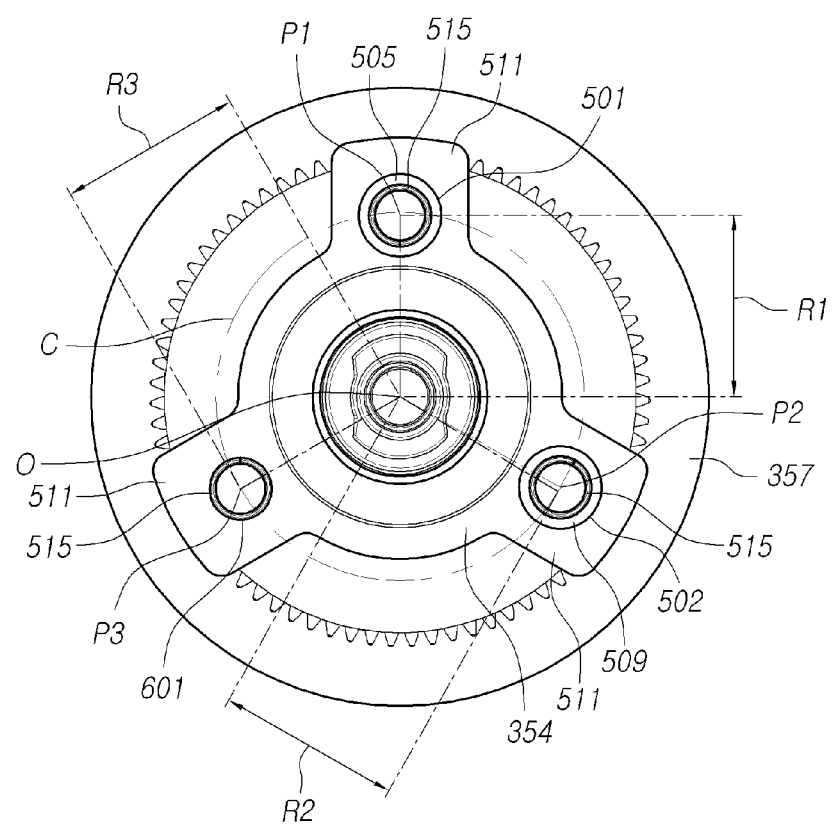
FIG. 6 is a view of a portion of FIG. 4.
Figure 7:
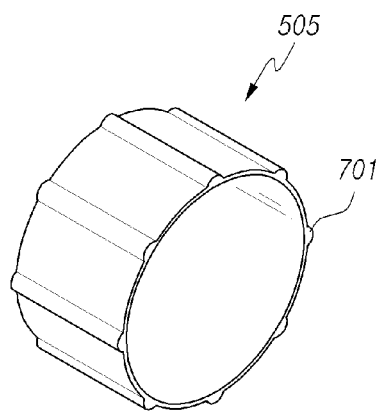
FIG. 7 is a perspective view of another embodiment of a first resilient member of FIG. 6.
Figure 8:
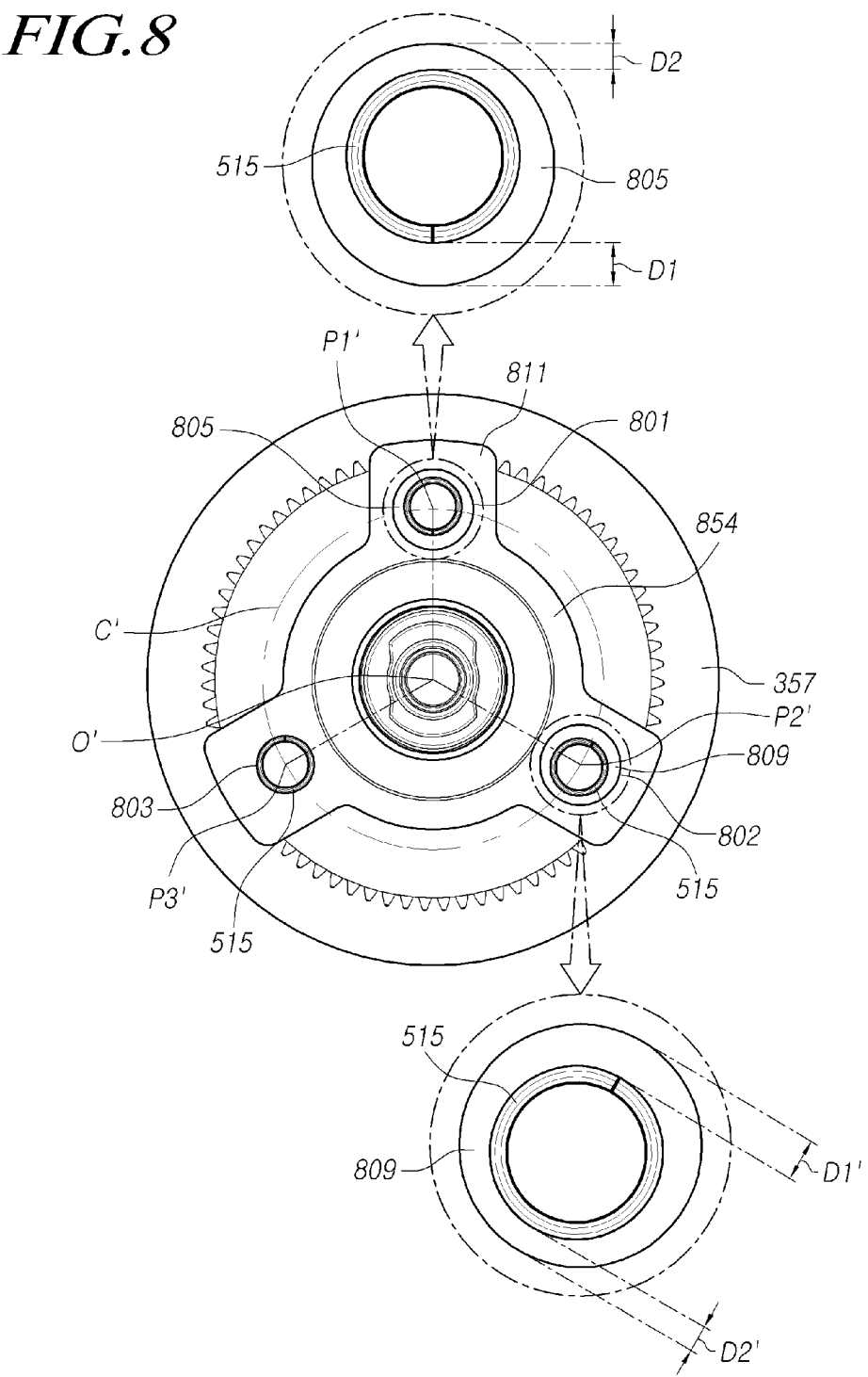
FIG. 8 is a view showing a structure of a portion of a reducer including a planetary gear according to another embodiment of the present invention.
Figure 9:
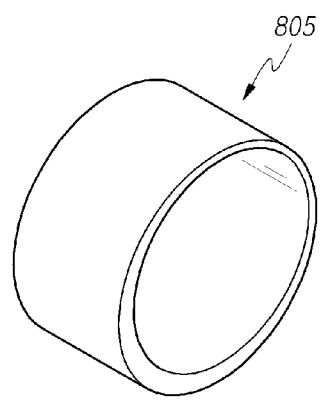
FIG. 9 is a perspective view of a first resilient member of FIG. 8.

FIG. 2 is a diagram of a steering apparatus of a vehicle including a reducer including a planetary gear according to an embodiment of the present invention. FIG. 3 is a sectional view of a portion of FIG. 2. FIG. 4 is an exploded perspective view of a portion of the reducer of FIG. 3. FIG. 5 is an exploded perspective view of the reducer of FIG. 4. FIG. 6 is a view of a portion of FIG. 4. FIG. 7 is a perspective view of another embodiment of a first resilient member of FIG. 6. FIG. 8 is a view showing a structure of a portion of a reducer including a planetary gear according to another embodiment of the present invention. FIG. 9 is a perspective view of a first resilient member of FIG. 8.

As shown in the drawings, the steering apparatus of a vehicle including a reducer including a planetary gear according to an embodiment of the present invention includes a motor 210 including a motor housing 311 and a hollow motor shaft 313, an input shaft 207 connected to a steering shaft 203 and connected to a pinion shaft 250 via a torsion bar 315, and a reducer 230 provided within the housing 331 coupled to the motor housing 311, for transferring rotation power of the motor 210 to a pinion shaft 250.

One side of the steering shaft 203 is connected to a steering wheel 201, and an opposite side thereof is connected to the input shaft 207 via a universal joint 205.

The input shaft 207 is connected to the pinion shaft 250 via the torsion bar 315, in which case a pinion gear 251 is formed in the pinion shaft 250 and the pinion gear 251 is engaged with a rack gear 221 formed in a rack bar 220.

Tie rods 223 are coupled to opposite sides of the rack bar 220 via inner ball joints, and the tie rods 223 are coupled to knuckle arms 225 connected to wheels 227.

A torque sensor 270 is coupled to an upper portion of the motor housing 311 and an electrical signal generated by the torque sensor 270 is forwarded to an electronic control unit (ECU) 211, and the electronic control unit 211 controls the motor 210 based on the electrical signal transmitted from the torque sensor 270 and electrical signals transmitted from other sensors.

The motor 210 includes a motor housing 311 and a motor shaft 313, and the motor 210 has a hollow shape such that the pinion shaft 250 is inserted into the motor shaft 313 and the pinion shaft 250 is connected to the input shaft 207 via the torsion bar 315 as described above.

Meanwhile, the reducer 230 according to the embodiment of the present invention is provided within a housing 331 coupled to a motor housing 311, for transferring rotation power of the motor 210 to a pinion shaft 250, and includes: for example, a sun gear 351 coupled to a hollow motor shaft 313; a plurality of first planet gears 355 circumscribed about the sun gear 351 and inscribed in a first ring gear coupled and fixed to an inner peripheral surface of the housing 331; a plurality of second planet gears 352 inscribed in a second ring gear 357 to which the pinion shaft 250 inserted into the motor shaft 313 and connected to the first planet gears 355 via connecting shafts; and a carrier 354 through which the pinion shaft 250 passes and having coupling holes such that the connecting shafts pass through and are coupled to the coupling holes, in which a distance R1 from the center O thereof to the center P1 of a first coupling hole 501 of the coupling holes and a distance R2 and R3 from the center O thereof to the centers P2 and P3 of the remaining coupling holes are different; and a first resilient member 505 coupled between a first connecting shaft 503 inserted into the first coupling hole 501 and the first coupling hole 501.

The sun gear 351 is coupled to the hollow motor shaft 313 of the motor 210, and is rotated in conjunction with the motor shaft 313.

The first planet gears 355 are circumscribed about the sun gear 351 and are inscribed in the first ring gear 353 coupled and fixed to an inner peripheral surface of the housing 331.

A plurality of first planet gears 355 may be provided, and an example in which three first planet gears 355 are provided is shown in the drawings.

Next, the second planet gears 352 are connected to the first planet gears 355 through connecting shafts, the second planet gears 352 are inscribed in the second ring gear 357 through which the pinion shaft 250 passes to be coupled to the second ring gear 357 and the pinion shaft 250 passing through and coupled to the second ring gear 357 is inserted into the hollow motor shaft 313 as described above.

Here, the second ring gear 357 has a coupling hole 357a at the center thereof such that the pinion shaft 250 passes through and is coupled to the second ring gear 357, and one side of the second ring gear 357 and an opposite side of the second ring gear 357 has an opened cylindrical shape.

Next, the pinion shaft 250 passes through the center of the carrier 354, and the coupling holes 501, 502, and 601 are formed such that the connecting shafts pass through and are coupled to the coupling holes 501, 502, and 601.

Here, a distance R1 from the center O thereof to the center P1 of a first coupling hole 501 of the coupling holes and a distance R2 and R3 from the center O thereof to the centers P2 and P3 of the remaining coupling holes are different.

For example, the distance R1 from the central shaft O of the carrier 354 to the center P1 of the first coupling hole 501 is shorter than the distance R2 and R3 from the central shaft O of the carrier 354 to the centers P2 and P3 of the remaining coupling holes 502 and 601, and the sizes of R1, R2, and R3 may be compared as follows.

$$R1<R2=R3$$

If R1 is different from R2 and R3, the planet gears 352 and 355 connected to the first connecting shaft 503 passing through and coupled to the first coupling hole 501 are engaged with the sun gear 351 and the ring gears 353 and 357 while being pressed in a radial direction of the carrier 354 from an initial assembly stage by a resilient force applied to the first resilient member 505, which will be described below.

Thus, a gap of the planet gears 352 and 355, the sun gear 351, and the ring gears 353 and 357 is compensated by a resilient restoring force of the first resilient member 505 even if the gear teeth are worn out as the reducer is used.

Of course, the sizes of R1, R2, and R3 may be as follows.

$$R1>R2=R3$$

Meanwhile, a plurality of protrusion supports 511 protruding radially are formed on an outer surface of the carrier 354, and the coupling holes 501, 502, and 601 may be formed in the protrusion supports 511, respectively.

A cutaway portion 504 may be formed in the protrusion support 511 to be opened to the radial outer side and opposite circumferential sides, the second planet gear 352 may be provided in the cutaway portion 504, and support plates 513 may be provided at opposite sides of the second planet gear 352 provided in the cutaway portion 504.

Of course, the support plate 513 may be provided between the planet gear 355 and the protrusion support 511.

Rotation support members are coupled to the connecting shafts including the first connecting shaft 503 and the second connecting shaft 507, and in particular, the rotation support member 515 coupled to the first connecting shaft 503 is coupled between an outer peripheral surface of the first connecting shaft 503 and the first resilient member 505, the rotation support member 515 coupled to the second connecting shaft 507 is coupled between an outer peripheral surface of the second connecting shaft 507 and the second resilient member 509, and the rotation support members 515 coupled to the connecting shafts other than the first connecting shaft 503 and the second connecting shaft 507 are coupled to the corresponding connecting shafts and the coupling holes.

The rotation support members may be, for example, low frictional bushes.

Next, the first resilient member 505 is coupled between the first connecting shaft 503 inserted into the first coupling hole 501 and the first coupling hole 501, and the first resilient member 505 may have a hollow cylindrical shape, or as shown in FIG. 7, a plurality of protrusions 701 protruding radially to the outside may be formed on an outer peripheral surface of the first resilient member 505.

When a plurality of protrusions 701 are formed on an outer peripheral surface of the first resilient member 505, the protrusions 701 are circumferentially spaced apart from each other at an equal separation.

Next, the second resilient member 509 may be coupled to the second coupling hole 502 of the coupling holes 501, 502, and 601, and the shape and structure of the second resilient member 509 may be the same or similar to those of the first resilient member 505.

The center P2 of the second coupling hole 502 of the carrier 354 may be formed so as not to be located on lines radially extending from the central shaft O of the carrier 354 at an equal angular separation, that is, the center P2 of the second coupling hole 502 is circumferentially inclined as compared with the centers P1 and P3 of the remaining coupling holes 501 and 601.

If the location of the second coupling hole 502 is set, the planet gears 352 and 355 connected to the second connecting shaft 507 passing through and coupled to the second coupling hole 502 are engaged with the sun gear 351 and the ring gears 353 and 357 while being pressed in a circumferential direction of the carrier 354 from an initial assembly stage by a resilient force applied to the second resilient member 509.

Thus, a gap of the planet gears 352 and 355, the sun gear 351, and the ring gears 353 and 357 is compensated by a resilient restoring force of the second resilient member 509 even if the gear teeth are worn out as the reducer is used.

Meanwhile, the setting of the location of the second coupling hole 502 and the setting of the distance R1 from the central axis O of the carrier to the center P1 of the first coupling hole 501 may be applied simultaneously or selectively.

Next, a reducer including a planetary gear according to another embodiment of the present invention includes: a sun gear 351 coupled to a hollow motor shaft 313; a plurality of first planet gears 355 circumscribed about the sun gear 351 and inscribed in a first ring gear 353 coupled and fixed to an inner peripheral surface of a housing 331, a plurality of second planetary gears 352 inscribed in a second ring gear 357 to which a pinion shaft 250 inserted into the motor shaft 313 is coupled and connected to the first planet gears 352 via connecting shafts; a carrier 854 having coupling holes 801, 802, and 803 such that the connecting shafts pass through and are coupled to the coupling holes 801, 802, and 803 and through which the pinion shaft 250 passes; and a first resilient member 805 coupled between a first connecting shaft 503 of the connecting shafts, for providing a resilient support force in a radial direction of the carrier 854.

Hereinafter, the carrier 854, the first resilient member 805, the second resilient member 809, and the like will be described.

The carrier 854 has the structure similar to that of the carrier 534 of the reducer including a planetary gear according to the above-described embodiment of the present invention, and the centers of the coupling holes 801, 802, and 803 are formed at locations spaced apart from the central axis O' of the carrier 854.

That is, the centers P1', P2', and P3' of the coupling holes 801, 802, and 803 are located on a circle C' whose center is the central axis O' of the carrier 854.

Meanwhile, the coupling holes 801, 802, and 803 are formed in the protrusion supports 811 protruding radially from an outer peripheral surface of the carrier 854, and the protrusion supports 811 has a structure similar to that of the above-described protrusion supports 511.

Next, the first resilient member 805 is coupled between the first connecting shaft 503 and the coupling hole 801 to provide a resilient support force in a radial direction of the carrier 854 and a thickness D1 of the first resilient member 805 facing an inside of the carrier 854 is different from a thickness D2 in an opposite direction, and for example, FIG. 8 shows an example in which D1 is larger than D2.

If the thicknesses of the first resilient member 805 is set to be different from each other, the planet gears 352 and 355 connected to the first connecting shaft 503 passing through and coupled to the first coupling hole 801 are engaged with the sun gear 351 and the ring gears 353 and 357 while being pressed in a radial direction of the carrier 854 from an initial assembly stage by a resilient force applied to the first resilient member 805.

Thus, a gap of the planet gears 352 and 355, the sun gear 351, and the ring gears 353 and 357 is compensated by a resilient force of the first resilient member 805 even if the gear teeth are worn out as the reducer is used.

Next, the second resilient member 809 is coupled between the second connecting shaft 507 of the connecting shafts other than the first connecting shaft 503 and the coupling hole 802 to provide a resilient support force in a circumferential direction of the carrier 854, and a thickness D1' of one of opposite sides of the second resilient member 509 facing a circumferential direction of the carrier 854 is different from a thickness D2' of the other side such that a resilient support force is circumferentially provided in the second connecting shaft 507, and FIG. 8 shows an example in which D1' is larger than D2'.

If the thicknesses of the second resilient member 509 in the circumferential direction of the carrier 854 are different from each other, the planet gears 352 and 355 connected to the second connecting shaft 507 passing through and coupled to the second coupling hole 802 are engaged with the sun gear 351 and the ring gears 353 and 357 while being pressed in a circumferential direction of the carrier 854 from an initial assembly stage by a resilient force applied to the second resilient member 509.

Thus, a gap of the planet gears 352 and 355, the sun gear 351, and the ring gears 353 and 357 is compensated by a resilient force of the second resilient member 809 even if the gear teeth are worn out as the reducer is used.

Meanwhile, the first resilient member 805 and the second resilient member 809 may be applied to the carrier 854 simultaneously or selectively.

According to the embodiments of the present invention, a gap generated due to wear of gear teeth of planet gears, sun gears, and ring gears can be compensated.

Even if it was described above that all of the components of an embodiment of the present invention are coupled as a single unit or coupled to be operated as a single unit, the present invention is not necessarily limited to such an embodiment. At least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. A reducer for a steering apparatus of a vehicle comprising:
a sun gear coupled to a hollow motor shaft;
a plurality of first planet gears circumscribed about the sun gear and inscribed in a first ring gear that is coupled and fixed to an inner peripheral surface of a housing;
a plurality of second planet gears inscribed in a second ring gear to which a pinion shaft, which is inserted into the hollow motor shaft, is coupled, the plurality of second planet gears being connected to the first planet gears via connecting shafts;
a carrier, through which the pinion shaft passes, having coupling holes such that the connecting shafts pass through and are coupled to the coupling holes, in which a distance from the center of the carrier to the center of a first coupling hole of the coupling holes and a distance from the center of the carrier to the centers of the remaining coupling holes are different; and
a first resilient member coupled between a first connecting shaft among the connecting shafts and the first coupling hole,
wherein the first connecting shaft is inserted into the first coupling hole.

2. The reducer of claim 1, further comprising a second resilient member coupled between a second connecting shaft among the connecting shafts and a second coupling hole of the coupling holes,
wherein the second connecting shaft is inserted into the second coupling hole.

3. The reducer of claim 2, wherein a plurality of protrusions protruding radially to the outside are formed on an outer surface of one or both of the first resilient member and the second resilient member.

4. The reducer of claim 3, wherein the protrusions are circumferentially spaced apart from each other at an equal separation.

5. The reducer of claim 2, wherein the carrier has a plurality of protrusion supports protruding radially and circumferentially formed on an outer peripheral surface thereof, and the coupling holes are formed in the protrusion supports, respectively.

6. The reducer of claim 5, wherein a cutaway portion is formed in the protrusion supports to be opened to a radial outer side and opposite circumferential sides, and the second planet gear may be provided in the cutaway portion.

7. A reducer for a steering apparatus of a vehicle, the reducer comprising:
a sun gear coupled to a hollow motor shaft;
a plurality of first planet gears circumscribed about the sun gear and inscribed in a first ring gear that is coupled and fixed to an inner peripheral surface of a housing;
a plurality of second planet gears inscribed in a second ring gear to which a pinion shaft, which is inserted into the hollow motor shaft, is coupled, the plurality of second planet gears being connected to the first planet gears via connecting shafts;
a carrier, through which the pinion shaft passes, having coupling holes such that the connecting shafts pass through and are coupled to the coupling holes; and
a first resilient member coupled between a first connecting shaft of the connecting shafts and a first coupling hole among the coupling holes inside the first coupling hole, for providing a resilient support force in a radial direction of the carrier,
wherein a thickness of the first resilient member facing an inside of the carrier is different from a thickness in an opposite direction such that the first resilient member provides a resilient support force to the first connecting shaft inside the first coupling hole in a radial direction.

8. The reducer of claim 7, wherein a second resilient member coupled between a second connecting shaft of the connecting shafts and a second coupling hole among the coupling holes, for providing a resilient support force in a circumferential direction of the carrier.

9. The reducer of claim 8, wherein the carrier has a plurality of protrusion supports protruding radially and circumferentially formed on an outer peripheral surface thereof, and the coupling holes are formed in the protrusion supports, respectively.

10. The reducer of claim 9, wherein a cutaway portion is formed in the protrusion supports to be opened to a radial outer side and opposite circumferential sides, and the second planet gears are provided in the cutaway portion.

11. The reducer of claim 7, wherein a thickness of one of opposite sides of a second resilient member facing a circumferential direction of the carrier is different from a thickness of the other side such that the second resilient member provides a resilient support force to the second connecting shaft inside a second coupling hole circumferentially.

12. A steering apparatus of a vehicle, comprising:
a motor comprising a motor housing and a hollow motor shaft;
an input shaft connected to a steering shaft and connected to a pinion shaft via a torsion bar; and
a reducer including a planetary gear set in a housing which is coupled to the motor housing to transfer rotation power of the motor to the pinion shaft,
wherein the reducer comprises:
a sun gear coupled to the hollow motor shaft;
a plurality of first planet gears circumscribed about the sun gear and inscribed in a first ring gear that is coupled and fixed to an inner peripheral surface of the housing;
a plurality of second planet gears inscribed in a second ring gear to which the pinion shaft, which is inserted into the hollow motor shaft, is coupled, the plurality of second planet gears being connected to the first planet gears via connecting shafts;
a carrier, through which the pinion shaft passes, having coupling holes such that the connecting shafts pass through and are coupled to the coupling holes, in which a distance from the center of the carrier to the center of a first coupling hole of the coupling holes and a distance from the center of the carrier to the centers of the remaining coupling holes are different; and
a first resilient member coupled between a first connecting shaft among the connecting shafts and the first coupling hole,
wherein the first connecting shaft is inserted into the first coupling hole.

* * * * *